US009596303B2

(12) United States Patent
Simmons et al.

(10) Patent No.: US 9,596,303 B2
(45) Date of Patent: *Mar. 14, 2017

(54) SYSTEMS AND METHODS FOR ESTABLISHING AND MAINTAINING VIRTUAL COMPUTING CLOUDS

(71) Applicant: AdmieMobile LLC, New York, NY (US)

(72) Inventors: David Simmons, Miami Beach, FL (US); Jonathan M. Conrad, New York, NY (US)

(73) Assignee: ADMIEMOBILE LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,945

(22) Filed: Nov. 3, 2014

(65) Prior Publication Data

US 2015/0058399 A1    Feb. 26, 2015

Related U.S. Application Data

(63) Continuation of application No. 13/191,848, filed on Jul. 27, 2011, now Pat. No. 8,880,580.

(Continued)

(51) Int. Cl.
*G06F 15/16* (2006.01)
*H04L 29/08* (2006.01)
*G06F 17/30* (2006.01)

(52) U.S. Cl.
CPC .... *H04L 67/1095* (2013.01); *G06F 17/30233* (2013.01)

(58) Field of Classification Search
CPC ............. H04L 67/1095; G06F 21/6218; G06F 2221/2151

(Continued)

(56) References Cited

U.S. PATENT DOCUMENTS 6,810,405 B1 * 10/2004 LaRue ................. A61M 19/00
                                                            707/613
8,041,677 B2   10/2011 Sumner et al.
(Continued)

OTHER PUBLICATIONS

Ramasubramanian, Venugopalan et al., "Cimbiosys: A Platform for Content-based Partial Replication", NSDI '09: 6th USENIX Symposium on Networked Systems Design and Implementation, Apr. 22, 2009, pp. 261-276.

(Continued)

*Primary Examiner* — Wing F Chan
*Assistant Examiner* — Andrew Woo
(74) *Attorney, Agent, or Firm* — Troutman Sanders LLP; Ryan A. Schneider; Christopher C. Close, Jr.

(57) ABSTRACT

Networking systems and methods for establishing and maintaining virtual computing clouds are disclosed. A networking system can comprise a server and various instances of a software agent, each agent being installed on a computing device participating in a virtual computing cloud. The server can maintain account setting for a user, wherein the settings can indicate which files on indicated computing devices are included in the virtual computing cloud. The networking system can selectively synchronize data between the computing devices automatically and in a secure manner, and can transmit data in real time to simulate local storage when synchronization of certain files is inappropriate in light of file incompatibility. As a result, the networking system can provide the user with a seamless, automatic system and method for accessing a total computing environment.

12 Claims, 7 Drawing Sheets

Related U.S. Application Data

(60) Provisional application No. 61/368,521, filed on Jul. 28, 2010.

(58) Field of Classification Search
USPC .................................................. 709/201, 202
See application file for complete search history.

(56) References Cited

U.S. PATENT DOCUMENTS

| | | | |
|---|---|---|---|
| 2002/0059201 A1 | 5/2002 | Work | |
| 2006/0242206 A1 | 10/2006 | Brezak et al. | |
| 2008/0059656 A1* | 3/2008 | Saliba | G06F 17/30017 |
| | | | 709/248 |
| 2009/0282169 A1 | 11/2009 | Kumar et al. | |
| 2010/0010944 A1 | 1/2010 | Cheng et al. | |
| 2010/0211651 A1* | 8/2010 | Guedalia | H04L 65/601 |
| | | | 709/217 |
| 2012/0117595 A1* | 5/2012 | Svendsen | H04N 5/76 |
| | | | 725/39 |

OTHER PUBLICATIONS

Supplementary European Search Report and Search Opinion dated Jun. 27, 2013 for related European Patent Application No. 11813110.1.
International Search Report and Written Opinion dated Mar. 27, 2012, issued by the Korean Intellectual Property Office for related PCT Application No. PCT/US2011/045533.

\* cited by examiner

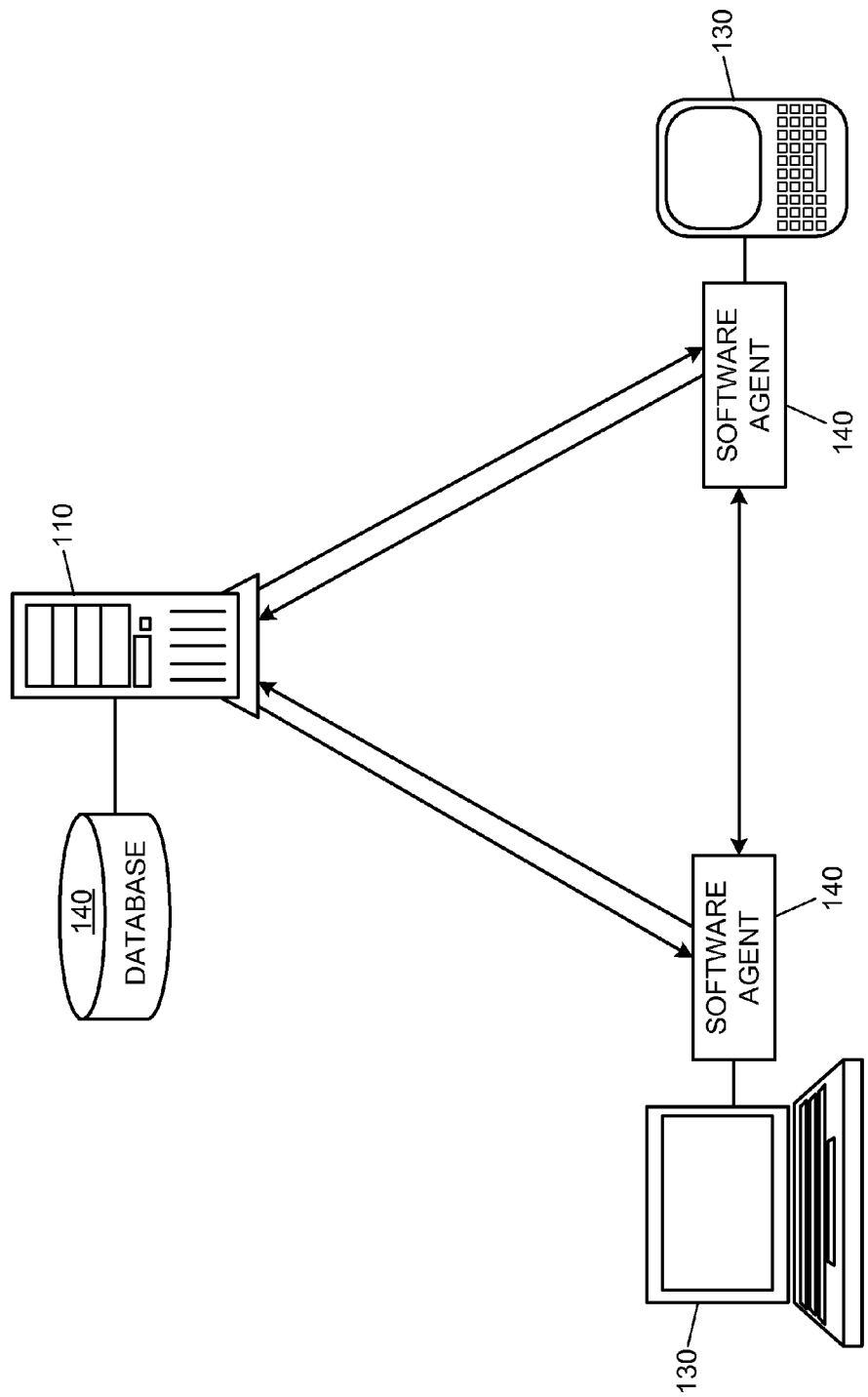

SYSTEMS AND METHODS FOR ESTABLISHING AND MAINTAINING VIRTUAL COMPUTING CLOUDS

CROSS-REFERENCE TO RELATED APPLICATIONS

This application is a continuation application claiming priority under 35 U.S.C. §120 to U.S. Non-provisional patent application Ser. No. 13/191,848, filed 27 Jul. 2011, which claims priority under 35 U.S.C. §119 to U.S. Provisional Patent Application No. 61/368,521, filed 28 Jul. 2010. The entire contents and substance of each of these priority applications is incorporated by reference as if fully set out below.

TECHNICAL FIELD

Various embodiments of the present invention relate to cloud computing and, more particularly, to systems and methods for creating virtual computing clouds.

BACKGROUND

Because of the popularity of computing devices, particularly mobile computing devices, a person is likely to store and edit digital files across multiple computing devices. While some convenience is achieved with the ability to access files on various devices without being tied to a single device, an inconvenience arises in that the person must constantly ensure that the devices contain the same, most recent version of each file. Further, not every device may be capable of executing the same software applications, and thus a file that is readable and editable on one device may not be readable or editable on a second device.

Some applications exist for remote controlling a remote computing device from a local computing device. While these applications can enable files on the remote device to be accessed from the local device, the user must actively run the remote control software to connect the local computing device to a specific host computer whenever the user desires to access files on the remote device. Resultantly, the user must remain aware of which devices contain the most up to date versions of files, so that the user can invoke a remote control application as needed to access the most up to date versions on other computing devices. Additionally, the user must be aware of which applications are installed on various host computers.

Additional applications exist to sync devices with one another, so that the devices contain the same versions of calendars and contacts. These syncing applications, however, are limited to calendars and contacts and thus do not enable users to access their other files from multiple devices.

Some online cloud computing services provide resources enabling individuals to store data remotely, so that the user can access the remote version of a particular file from various computing devices, thus reducing the problem of inconsistent versioning. With these online services, remotely viewing and editing a file of a particular format is only possible if the online service provides a web-based application for viewing and editing files of that format. Because it is impractical for an online service to provide a web-based application for every conceivable file type, certain files are not supported and are thus not viewable and editable remotely using these online services. Each unsupported file must be downloaded to a local computing device before being viewed or edited, thus recreating the problem of inconsistent versioning across multiple devices when a file is downloaded to multiple computing devices for local access. Further, storing files remotely with these online services may violate confidentiality policies, such as those related to a user's employment.

Social media networks allow users to store files in a central location but lack sufficient security for viewing and accessing the stored files. Lack of appropriate security in social media networks may cause users' private and personal data to be released to the public.

Accordingly, conventional systems lack a secure, seamless solution to the problems posed by maintaining files or accessing applications on multiple computing devices.

SUMMARY

There is thus a need for systems and methods that provide personal computing clouds, whereby a user can access his or her digital resources from various computing devices regardless of which applications are stored locally on the computing devices. It is to such systems and methods that various embodiments of the present invention are directed.

Briefly described, various embodiments of the present invention can be networking systems and methods configured to establish and manage personal computing clouds. According to an exemplary embodiment, a networking system can provide peer-to-peer services facilitated by a central server and various instances of a software agent.

A user of the networking system can communicate with the server to create an account on the networking system. After establishing an account and registering one or more computing devices to the account, an instance of a software agent can execute on each of the registered devices. The software agent can provide a directory listing to the server, which can enable the user to indicate which files on the user's computing devices are included in a personal computing cloud.

Each instance of the software agent can be associated with a particular computing device and participating in the computing cloud, in some embodiments, can be installed on that computing device. The software agent can be responsible for collecting local file information from the computing device with which is it associated, including for each file, for example: file name, file type, date accessed, date modified, data created, indication of an application capable of launching the file, and other meta-data. Such collection can occur at various times, including, for example, upon initial registration of the local computing device, as well as periodically thereafter. The software agent can generate a local map database of files on the local computing device. The software agent can also report the collected information, including the local map database, to the central server, which can maintain a central directory listing. The central directory listing can list each computing device's files, associated with the applicable metadata.

On a local computing device, the software agent can ensure that the user has access to the most recent version of each file in the personal cloud. If the user indicates an intention to access a particular file included in the cloud, such as by clicking on an icon representing the file on the local computing device, the networking system can recognize that the file is part of the cloud and, by way of the central server, can compare the version on the local computing device with versions of the file on the other computing devices associated with the user's account. If one of the other, remote computing devices contains a more recent version of the file, the central server can initiate a transfer of the file from the remote computing device to the local computing device. Instructions on how to perform peer-to-peer transfers can be provided by the central server and distributed to the appropriate software agents. For example, and not limitation, the central server can provide each applicable software agents with the IP address of the other applicable computing device, encryption methods, authentication methods, bandwidth limitations, and proxy services required to bypass any firewalls.

The central server can enable each user to manage his file synchronization among all registered computing devices. Upon instruction from the central server, the software agent can compare its local map of files to the central server's directory file listing. The central server can resolve conflicts between various versions of a file across multiple computing devices registered to a single user account. As needed, the central server can instruct the software agents to perform peer-to-peer transfer between the computing devices, so that the most recent version of an accessed file is available to the user at the computing device currently in use.

If a local computing device is incapable of displaying a file sought to be accessed at that computing device, for example, if the local computing device does not have a compatible application for viewing and editing the file, then at prompting from the central server, a local software agent on the local computing device can cooperate with a remote software agent on a remote computing device to seamlessly provide the file to the user. Reference to computing cloud files not capable of being access on the local computing device can be displayed as virtual files, where, for example, the file name can be a link to the central server. If the user requests access to a virtual file not capable of being accessed, the central server can initiate a display protocol to enable the file to be opened on the remote computing device but displayed and controlled on the local computing device. The remote software agent can open the file in the appropriate application on the remote computing device, and can communicate with the local software agent to enable display and control of the application on the local computing device. Thus, from the local computing device, the user can view and edit the file on the remote computing device as if the file were stored locally.

Accordingly, various embodiments of the networking system can selectively synchronize data between computing devices automatically and in a secure manner, and can transmit data in real time to simulate local storage when synchronization of certain files is inappropriate in light of file incompatibility. As a result, the networking system can provide users with a seamless, automatic system and method for accessing their total computing environment.

These and other objects, features, and advantages of the networking system will become more apparent upon reading the following specification in conjunction with the accompanying drawing figures.

BRIEF DESCRIPTION OF THE FIGURES

FIG. 7 illustrates synchronization of the virtual cloud of FIG. 6, according to an exemplary embodiment of the present invention.

DETAILED DESCRIPTION

Figure 1:
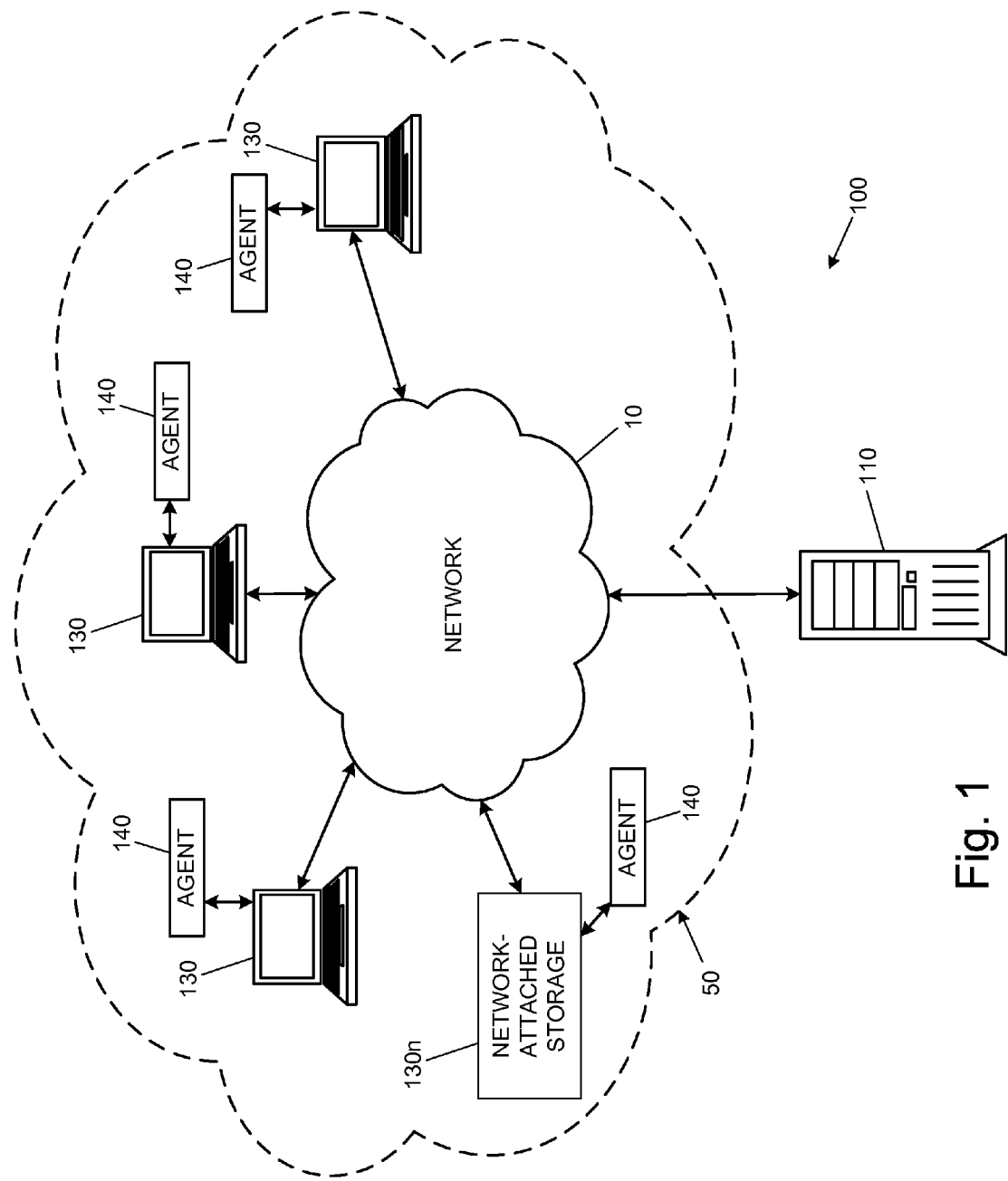
FIG. 1 is a diagram of a networking system, according to an exemplary embodiment of the present invention.

To facilitate an understanding of the principles and features of the invention, various illustrative embodiments are explained below. In particular, the invention is described in the context of being a networking system for establishing and managing computing clouds for maintaining a personal collection of data and files for access from various computing devices. Embodiments of the invention, however, are not limited to computing clouds for personal use. Rather, although a computing cloud may be referred to herein as a "personal" cloud, this term is used to indicate only that the computing cloud can be provided for predetermined individuals, and need not be shared with outside parties. Various exemplary embodiments of the networking system may establish and manage other types of computing clouds besides those that are established for personal use, such a computing cloud for a business use that may be accessible for multiple parties, or may alternatively be used for various networking purposes other than cloud computing.

The materials and components described hereinafter as making up elements of the invention are intended to be illustrative and not restrictive. Many suitable materials and components that would perform the same or similar functions as the materials and components described herein are intended to be embraced within the scope of the invention. Other materials and components not described herein can include, but are not limited to, for example, similar or analogous materials or components developed after development of the invention.

Various embodiments of the present invention can be networking systems for establishing and maintaining virtual clouds. Referring now to the figures, in which like reference numerals represent like parts throughout the views, various embodiment of the networking system will be described in detail.

FIG. 1 is a diagram of a networking system 100, according to an exemplary embodiment of the present invention. As shown in FIG. 1, the networking system 100 can comprise one or more servers 110 for managing a plurality of user accounts 120, a plurality of computing devices 130 associated with the user account, and a plurality of managing software agents 140, where each software agent 140 is associated with a corresponding computing device 130.

Exemplary networking systems 100 of the present invention can bridge multiple, unlike devices together in a virtual workspace, or personal computing cloud 50, so as to allow seamless access from a local computing device 130 without relying on insecure third-party hosting. The networking system 100 can thus empower users to seamlessly and intelligently access data and programs from various devices.

An exemplary embodiment of the networking system 100 can be a seamless file-transfer and remote application delivery, wireless software solution capable of running on, for example and not limitation, Windows®, Apple® OSX, Blackberry®, Google® Android, iPad®, iPhone®, and Symbian®. The networking system 100 can combine remote access methods and file transfer solutions. The networking system 100 can synchronize files between computing devices 130 and can intelligently decide when to seamlessly display a program from a first computing device 130 to a second computing device 130, when the second computing device 130 does not support local display of a requested file associated with the program.

Information related to various files, including calendar and contact entries and short message service (SMS) messages, may be provided to the server 110 provided by each software agent 140. The software agent 140 may collect contact and calendar entries and messages, along with other files in virtual cloud 50, and transmit such entries and messages to the server 110. The server 110 may reconcile files between various computing devices 130 based on information received from the various software agents 140 on those computing devices 130. During reconciliation, peer-to-peer transfers between the computing devices 130 may be initiated by the server 110 to add, remove, or update contact and calendar entries, SMS messages, and other files. For example, a local Windows-based software agent 140 may collect calendar and contact entries from Microsoft® Outlook and report such entries to the server 110. The server 110 may then reconcile files across various computing devices 130 as needed, by initiating the peer-to-peer file transfers between the computing devices 130.

Figure 2:
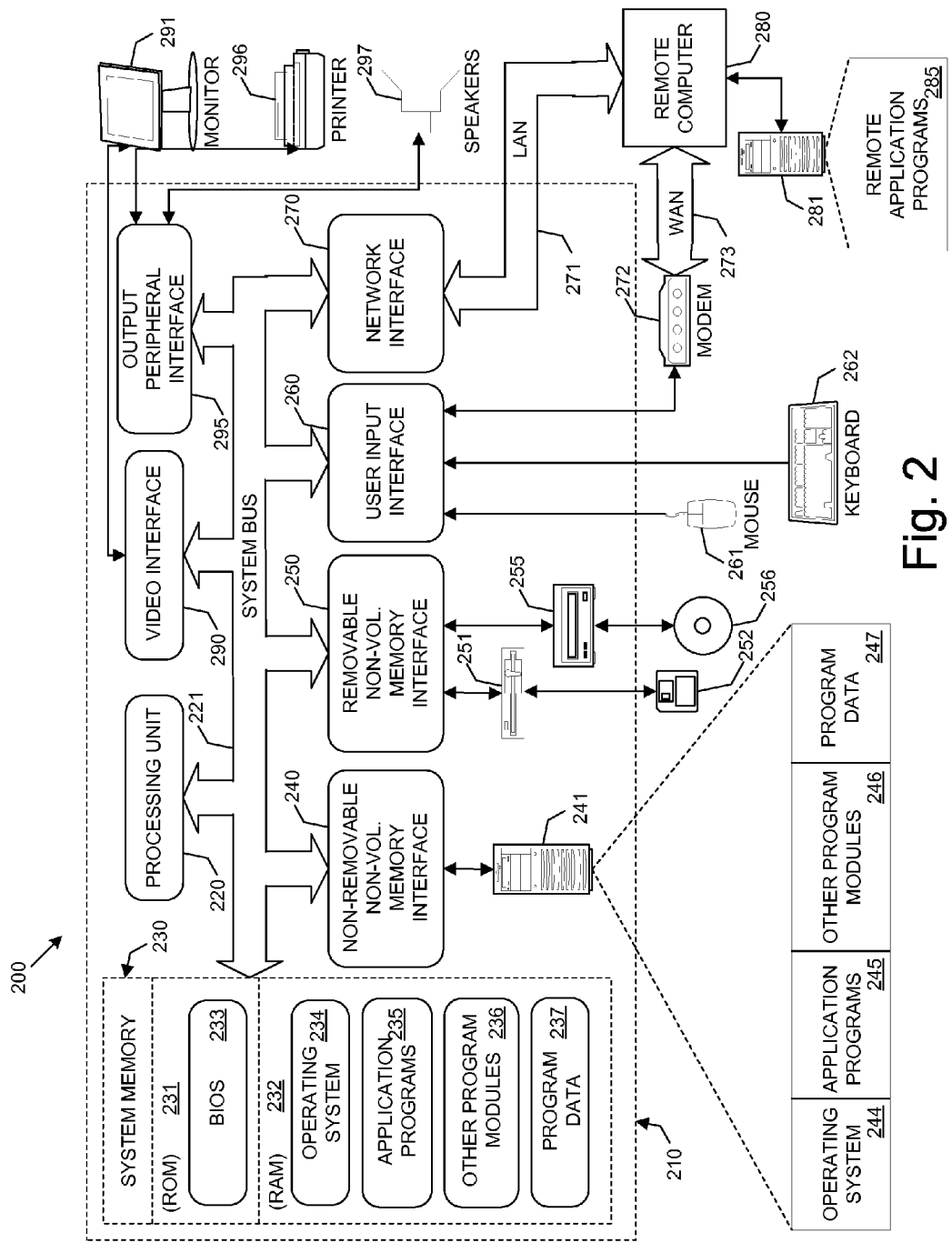
FIG. 2 illustrates a computer architecture of an exemplary computer system, which can be used in the networking system, according to an exemplary embodiment of the present invention.

FIG. 2 illustrates a computer architecture of an exemplary computer system 200, which can be used as the server 110 or one or more of the computing devices 130. Exemplary embodiments of the networking system 100 can be described in a general context of computer-executable instructions, such as one or more applications or program modules, stored on a computer-readable medium and executed by a computer processing unit of the computer system 200.

With reference to FIG. 2, components of a computer system 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 200 can include a variety of computer readable media. Computer-readable media can be any available media that can be accessed by the computer system 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computer system 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computer system 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computer system 200 can also include other removable/non-removable, volatile/nonvolatile computer storage media. By way of example only, FIG. 2 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 can provide storage of computer readable instructions, data structures, program modules and other data for the computer system 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computer system 200 can enter commands and information into the computer system 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computer system 200 can also include other peripheral output devices such as speakers 297 and a printer 296. These can be connected through an output peripheral interface 295.

The computer system 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computer system 200, including a memory storage device 281. The logical connections depicted in FIG. 2 include a local area network (LAN) 271 and a wide area network (WAN) 273, but can also include other networks.

When used in a LAN networking environment, the computer system 200 can be connected to the LAN 271 through a network interface or adapter 270. When used in a WAN networking environment, the computer system 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computer system 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

Referring now back to FIG. 1, each of the server 110 and the computing devices 130 may be a computing device such as that depicted in FIG. 2. It will be understood, however, that FIG. 2 is provided for illustration only and does not limit the various embodiments of the invention. A computing device 130 used with the embodiments of the present invention can be of various types, including, but not limited to, those conforming to FIG. 2. For example, and not limitation, a computing device 130 used with embodiments of the present invention can a mobile telephone, a personal computer, or a video game console.

Referring now back to FIG. 1, each of the computing devices 130 can have a distinct set of files and settings. An end user can use multiple computing devices 130, as shown, each with its own set of files and settings. Multiple devices can give the user freedom of mobility, but can also introduce the logistical problem of maintaining files and settings across the multiple devices. Conventionally, the user can maintain data locally on each computing device 130, and that data can be changed locally on each computing device 130. As a result, copies of the same files stored on different computing devices 130 can differ from one another, as each copy can be modified independent of the other copies.

Figure 3:
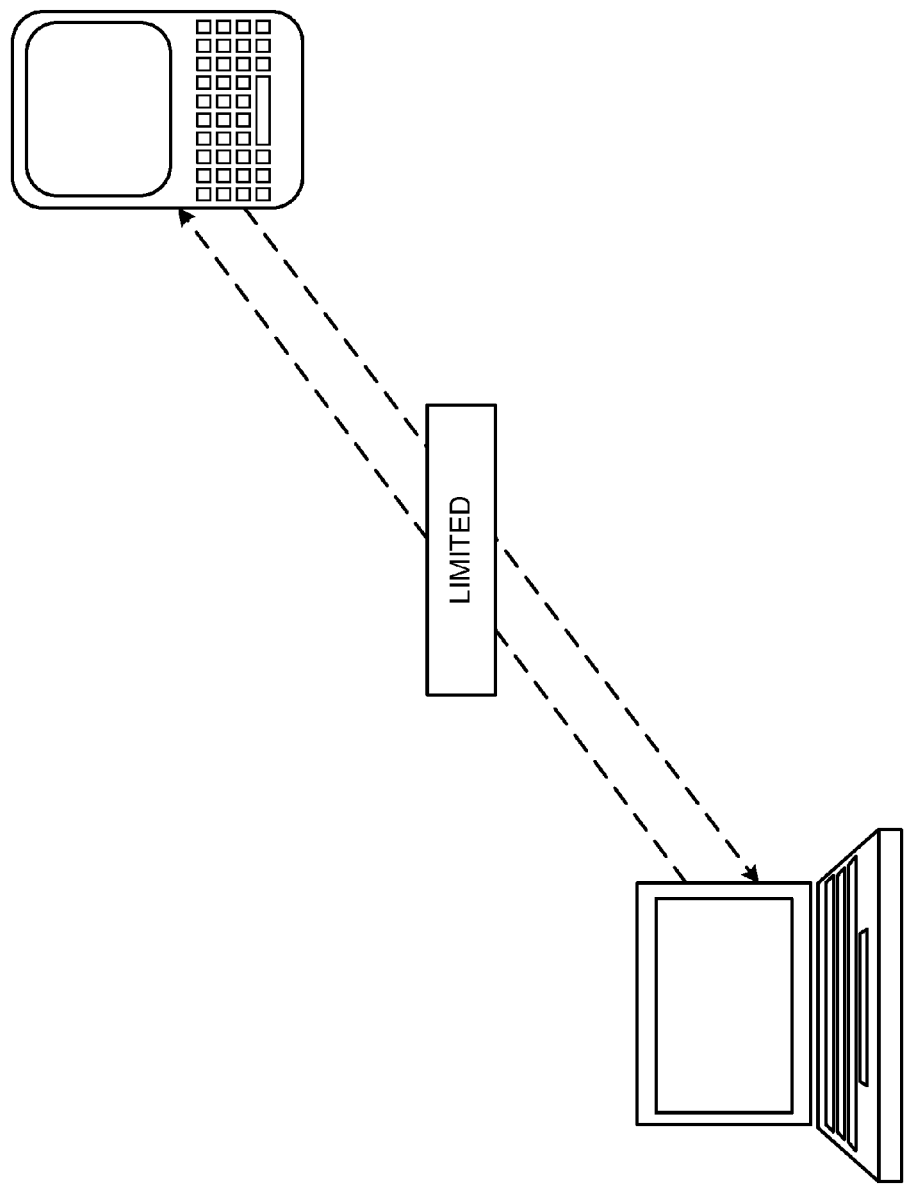
FIG. 3 is a diagram of conventional synchronization between computing devices.

As shown in FIG. 1, each computing device 130 can contain a separate local set of files, including, for example, contacts, music, programs, and email. Because email is conventionally stored on a remote email server, email can be remotely accessible from all of the computing devices 130. FIG. 3 is a diagram of conventional synchronization between computing devices 130. As shown in FIG. 3, local copies of email and contacts can remain consistent through use of conventional synchronization systems, but these synchronization systems fail to support other file types.

As illustrated by FIG. 3, remaining file formats, other than email and contacts, are not synchronized between computing devices 130 by conventional synchronization systems. Conventionally, the user must actively transfer files between the computing devices 130 to ensure that the most recent files exist on whichever of the computing devices 130 is currently the local computing device 130. Some companies, such as Google, Microsoft, and Yahoo, attempt to solve the problem of separate local files by providing online services such as Gmail and Google Apps. By hosting files on a central, online service, the user can access those files through web-based programs tied to the online service. This approach is a simple way to solve the logistical access problem but requires a change in consumer and business behavior to using unfamiliar, web-based applications. Further, remote viewing and revising is available with these online services only for those files for which a compatible web-based application is provided. Files for which a web-based application is not provided must be downloaded before being viewed or edited, thus recreating the original problem of distinct local copies.

Other applications to circumvent the problems created by the use of multiple computing devices 130 are standalone remote desktop applications such as Citrix's "Go To My PC" or integrated file synchronization programs. These file synchronization programs limit the types of transferable files, usually to contacts and multimedia, and require a local USB or Bluetooth connection. Other vendors, such as CompanionLink and SugarSync, offer over-the-air and wireless synchronization capabilities for data but do not address the issue of program accessibility for applications not available on a local computing device 130.

FIG. 1 further illustrates a personal computing cloud 50, or virtual cloud, established by the networking system 100 and capable of solving the various problems presented above, according to an exemplary embodiment of the present invention. For a user at any one of the computing devices 130 registered to his or her account with the networking system 100, it can appear that current versions all of the files linked to the account are stored on that computing device 130. Accordingly, at each registered computing device 130, the user can access the files without regard to where the most recent versions of the files are actually stored.

After or during registration with the networking system 100, a user can register two or more computing devices 130 to his account. When each of these computing devices 130 connects to the server 110, the server 110 can deploy a software agent 140 from to that computing device 130. The software agent 140 can collect a list of available files on the computing device 130 and transmit that list to the server 110. Unless otherwise indicated by the user, the software agent 140 can also catalog and transfer to the server 110 information about default application types for the associated computing device 130. For example, if the computing device 130 is a personal computer, the agent can transfer information to the server 110 about QuickBooks, Office, Microsoft Money, and other types of files, unless instructed not to do so. If software agents 140 have been deployed to more than a single registered computing device 130 of the user's account, the server 110 can compile a combined list of files received from the multiple software agents 140. The server 110 may present the list of available files, i.e., the files identified as being available by the software agents 140, to the user. The user may then select all or a subset of the available files as files to be included in the user's virtual cloud 50. In some embodiments of the networking system 100, only these selected files are included in the virtual cloud 50 and thus available through the networking system 100 to the computing devices 130 registered to the user's account. After initial setup of the computing cloud, the server 110 may allow the user to add or remove files from the virtual cloud 50 upon the user's request.

The server 110 may maintain a cloud list, associated with the user's account, of all the files in the user's virtual cloud 50. In some embodiments of the networking system 100, this cloud list may be maintained as a database. The file list may comprise various details about each file in the virtual cloud 50, such as, for example, one or more of the following: file name, file type, hash of file, and timestamp of last edit. Because the information for a particular file may vary across the registered computing devices 130, particularly after a file in the virtual cloud 50 is edited on one of the computing devices 130, the server 110 may maintain in the file list information for each version of a file across the various computing devices 130, where each version information is linked to the corresponding computing device 130. In an exemplary embodiment of the networking system 100, the server 110 does not maintain copies of the files themselves, because maintaining copies of the files can pose a security list. However, the invention is not limited to embodiments in which the server 110 does not maintain file copies.

After the various software agents 140 have collected information about selected files in the virtual cloud 50, the server 110 can identify which of the registered computing devices 130 need to receive files and can instruct the software agents 140 to transmit files directly between the computing devices 130 as appropriate for synchronization. Cloud files to be synchronized may include, for example, local files, network files (e.g., for business users), or contacts and calendar information, as indicated by the user when selecting files to be included in the virtual cloud 50.

When a registered computing device 130 connects to the server 110 for the first time, and as needed after the first connection, the software agent 140 running on the computing device 130 may report which of the files in the virtual cloud 50 are present on the computing device 130. The software agent 140 may also detect which of the files in the virtual cloud 50 the computing device 130 is capable of accessing and what degree of access to each file is available on the computing device 130. For example, and not limitation, if the computing device 130 has an application capable of viewing but not editing a first file in the virtual cloud 50, the software agent 140 may report to the server 110 that the first file may be viewed but not edited on the computing device 130. The software agent 140 may then report to the server 110 which files are present, which files are accessible, and to what degree each accessible file can be accessed by the computing device 130.

The server 110 may perform an initial synchronization and, as needed based on indication from the software agents 140 or the cloud list, one or more update synchronizations for each computing device 130 registered to the user's account. Initial synchronization may occur automatically upon the first time that the computing device 130 connects to the server 110 after being registered to the account. In some exemplary embodiments, an update synchronization can occur if, or whenever, the server 110 determines that the computing device 130 has a non-preferred version of a file in the virtual cloud 50, and further determines that a preferred version of such file is available. Further, whenever the user adds files to the virtual cloud 50, update synchronization may occur automatically upon the next time the computing device 130 connects to the server 110 to ensure that the computing device 130 has the most preferred version of the newly added files that are available.

During a synchronization, the server 110 may determine, for one or more files in the virtual cloud 50, whether the current state of such file on the computing device 130 in question is improvable. Improvability of a file may be deemed if two criteria are met: (1) The state of the file should be improved, and (2) the state of the file can currently be improved. The server 110 may determine that the state of a file should be improved if the file is unavailable on the computing device 130, or if the file is available on the computing device 130 but is not the most preferred version of the file according to the cloud list. In some embodiments, no improvement of a file's state may be deemed necessary is the computing device 130 is incapable of viewing or editing the file, regardless of whether the file would otherwise be deemed improvable. If the server 110 determines that the state of the file should be improved, the server 110 may then determine whether the state of the file can be improved, which may require that a preferred version of the file is currently available from another registered computing device 130. If a preferred version of the file is available, the server 110 may initiate a peer-to-peer transfer of the preferred version to the computing device 130.

In some embodiments of the networking system 100, the server 110 need not provide the computing device 130 with copies of files that the computing device 130 is incapable of opening. Rather, the server 110 may instead instruct the software agent 140 of the computing device 130 to provide a virtual file, which may be a link to the file within the virtual cloud 50. A link to the virtual file may be visible in the same manner that other files on the computing device 130 would be visible, thus appearing to the user as if the virtual file is stored on the computing device 130.

During a synchronization, the server 110 may identify the most preferred version available of each improvable file on the computing device 130 sought whose cloud files are sought to be synchronized. The server 110 may facilitate transmission of these preferred versions of the files from at least one other computing device 130 in the virtual cloud 50 to the computing device 130 in question. In an exemplary embodiment of the networking system 100 in which the server 110 does not maintain copies of the files, synchronization may occur at instruction from the server 110 to the applicable software agents 140 to perform peer-to-peer transfers. For example, if the server 110 determines, based on the cloud list, that a first computing device 130 has a non-preferred version of a file (or no version of the file) and that a second computing device 130 is available and has a preferred version of the file, then the server 110 can instruct the software agent 140 at the second computing device 130 to transfer the preferred version of the file directly to the first computing device 130. In that case, at least one other computing device 130 registered to the user's account must be powered on and accessible to the networking system 100 in order for initial or update synchronization to occur. In an exemplary embodiment, the preferred version of the file does not pass through the server 110 while being transferred between the second and first computing devices 130.

When the user attempts to access a file in the virtual cloud 50 on a registered computing device 130, such as may be evidenced by selection of the file on that computing device 130, the software agent 140 on the computing device 130 may automatically contact the server 110 to determine whether the selected file is improvable. If the file is improvable, then an update synchronization may be automatically performed to provide a more preferred version of the file on the computing device 130 before access is provided to the user. The update synchronization may be limited to only the file sought to be accessed. Accordingly, the user may seamlessly access the most preferred version of the file that is available in the virtual cloud 50, without having to manually request a file update.

As discussed above, a file that cannot be opened by a first computing device 130, such as when the first computing device 130 does not have an application installed for viewing or editing the file, may appear on the computing device 130 as a virtual file. When the user attempts to open a virtual file in the virtual cloud 50, the networking system 100 may initiate an interactive display protocol to provide the user with the requested access to the file on the first computing device 130. The server 110 may identify a registered second computing device 130 that is capable of opening the file in the manner requested. The server 110 may determine availability by attempting to contact one or more software agents 140 on one or more of the registered computing devices 130 that, according to the cloud list, are capable of opening the file in the manner requested by the user. A software agent 140 may respond only if its corresponding computing device 130 is available. Of the computing devices 130 associated with software agents 140 that respond, the server 110 may select as the second computing device 130 the one preferred by the user (as indicated in the user's preferences), or the server 110 may select the one with the most preferred version of the file. If the selected second computing device 130 does not have the most preferred version of the file that is currently available, the networking system 100 can perform an update synchronization on the second computing device 130, so that the most preferred version is transmitted to the second computing device 130. After selection and updating of the second computing device 130, the display protocol may be performed. The display protocol may include remote control of the second computing device 130 by the first computing device 130. The server 110 may instruct the software agents 140 at the first and second computing devices 130 to participate in the remote control activity, so as to provide the requested access to the file on the first computing device 130. It will be understood that various methods of remote control, many of which are well-known in the art, may alternatively be used to provide the user viewing or editing access to the file at the first computing device 130.

In some embodiments of the networking system 100, the first computing device 130 may be capable of viewing but not editing the file sought be accessed. In that case, the server 110 may open the file locally at the first computing device 130 if only viewing of the file is requested, and the server 110 may initiate the display protocol involving the second computing device 130 when editing of the file is requested on the first computing device 130.

The networking system 100, such as through the server 110, may receive preferences from the user regarding synchronizations and display of virtual files. For example, and not limitation, the user can rank the various registered computing devices 130, where a higher-ranked computing device 130 may be selected before a lower-ranked computing device 130 to provide a preferred version of a file during synchronization or during use of the display protocol. The user can also indicate rules for determining when a first file version is to be deemed preferred over another. In the absence of such rules, the networking system 100 may, for example, deem a first file as preferred over a second file when and only when the first file has a more recent timestamp than the second file.

Figure 4:
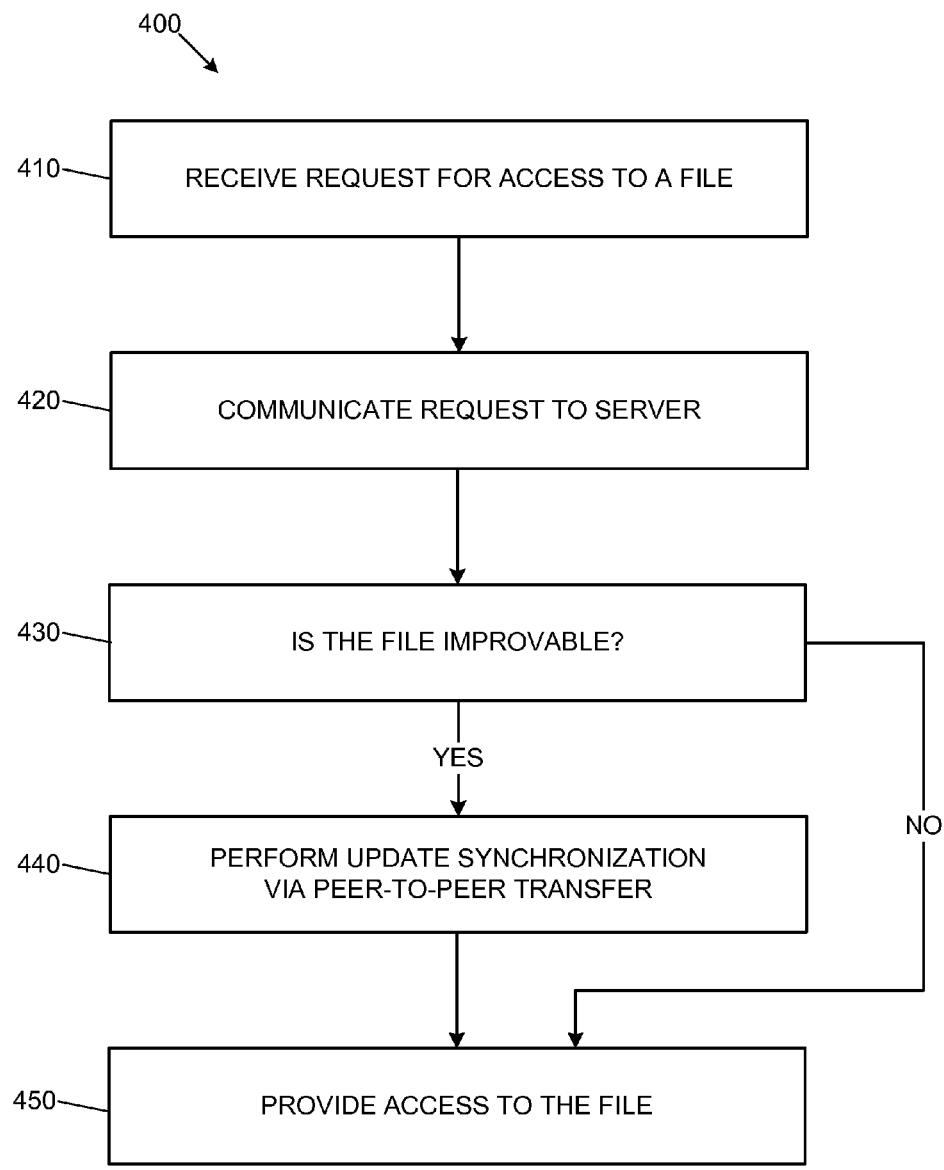
FIG. 4 illustrates a method of accessing a file in a virtual cloud from a registered computing device, according to an exemplary embodiment of the present invention.

FIG. 4 illustrates a method 400 of accessing a file in a user's virtual cloud 50 from a registered first computing device 130. At 410, a software agent 140 on the first computing device 130 receives a request for access to the file. At 420, the software agent 140 communicates the request to the server 110. At 430, the server 110 determines whether the file on the computing device 130 is improvable. If the file is not improvable, at 450, the software agent 140 provides access to the file on the computing device 130. If the file is improvable, at 440, the server 110 instructs a second computing device 130 to transmit a preferred version of the file to the computing device 130. After the transmission, at 450, the software agent 140 provides access to the file, which is now updated, on the computing device 130.

Figure 5:
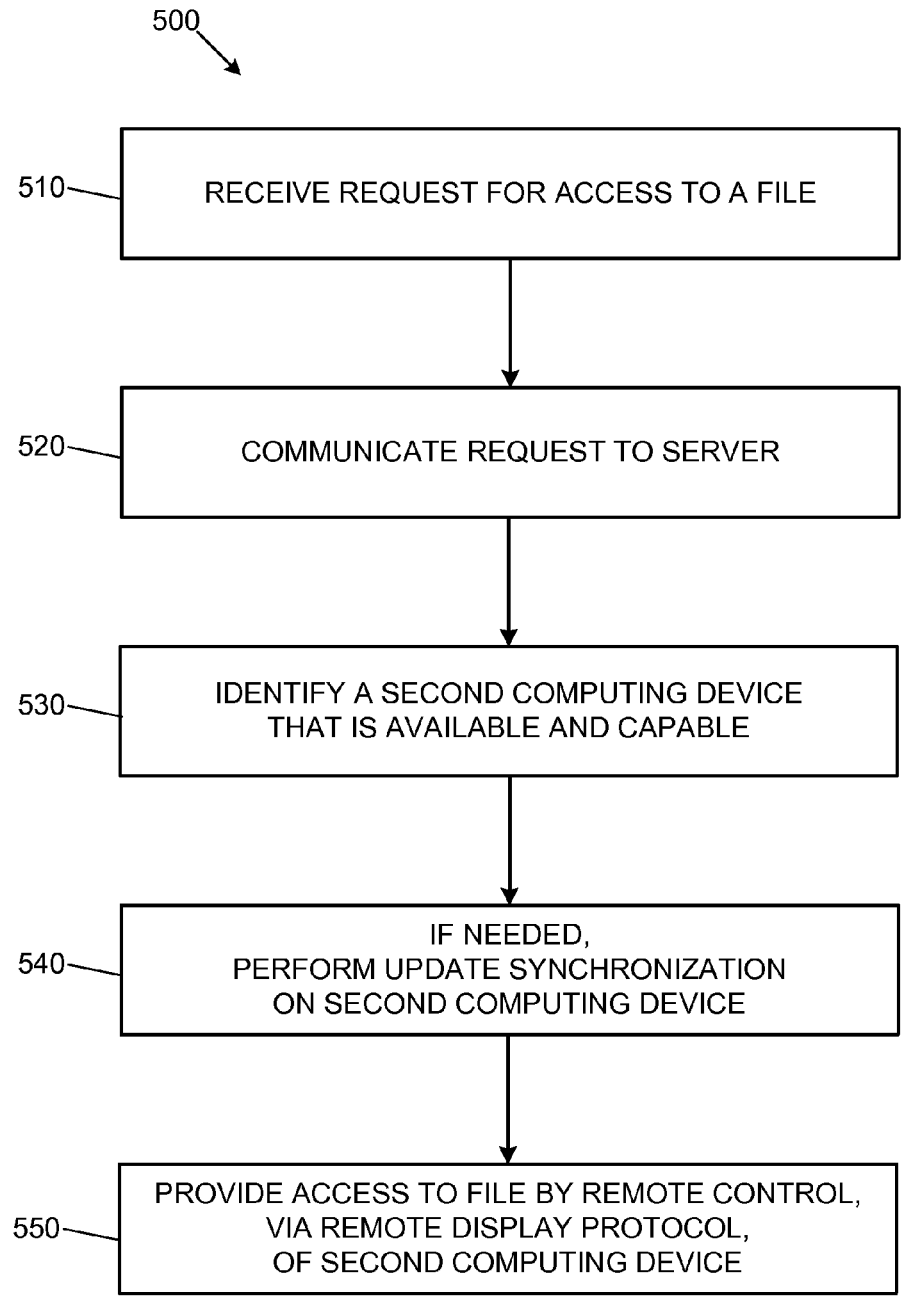
FIG. 5 illustrates a method of opening a file in a virtual cloud from a registered computing device, where the file is not locally openable on the computing device, according to an exemplary embodiment of the present invention.

FIG. 5 illustrates a method 500 of opening a file in a user's virtual cloud 50 from a registered first computing device 130, where the file is not locally openable on the first computing device 130. At 510, a software agent 140 on the first computing device 130 receives a request for access to the file, which request may be provided by selection of a virtual file on the computing device 130. At 520, the software agent 140 communicates the request to the server 110. At 530, the server 110 identifies a registered second computing device 130 that is available to provide the file to the first computing device 130. At 540, if needed, an update synchronization is performed on the file at the second computing device 130. At 550, the software agent 140 provides the requested access of the first file by remote control of the second computing device 130.

In some embodiments of the invention, a standalone network attached storage (NAS) device 130*n* (see FIG. 1) can be supported as a computing device 130 in the virtual cloud 50. In these embodiments, the storage device 130*n* can have preloaded software containing the software agent 140. When the storage device 130*n* is in communication with the network 10, the files on the storage device 130*n* that are included in the virtual cloud 50 can be kept up to date by the networking system 100, as will other registered computing devices 130. Thus, the storage device 130*n* can be used to automatically backup the files included in the virtual cloud 50. The user can then access the backup files through the virtual cloud 50, as well as locally at the selected storage device 130*n*. Alternatively or additionally, if the user indicates a desire to back files up remotely, the files in the virtual cloud 50 can also be automatically backed up remotely, such as to the server 110 or to a different server belonging to a remote storage provider.

In some exemplary embodiments of the networking system 100, the server 110 can enforce security policies of an organization that uses a virtual cloud 50 of the present invention. For example, and not limitation, when a user attempts to add a new computing device 130 to a virtual cloud 50 managed by an organization to which the user belongs, the server 110 can require that the new computing device 130 comply with any security measures known to be associated with the organization. For example, if an administrator of the organization previously indicated to the server 110 that a password is required, then the server 110 can require that the new computing device 130 be password-protected. If the new computing device 130 does not have the required security measures in place, the server 110 can reject addition of the new computing device 130 to the computing cloud. Thus, a confidential file in the cloud can be secured by a required level of security regardless of the computing device 130 utilized to access the confidential file in the virtual cloud 50.

Figure 6:
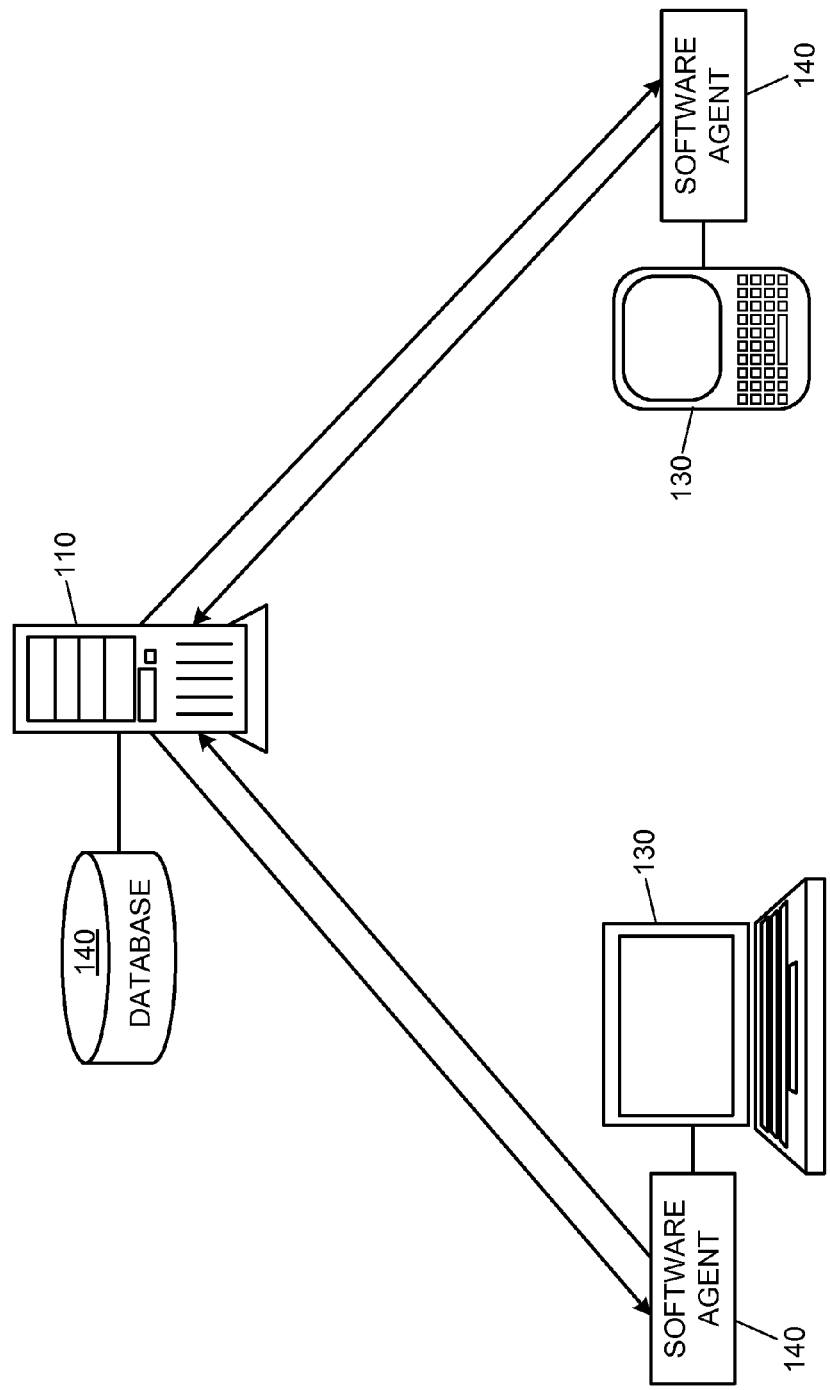
FIG. 6 illustrates initialization of a virtual cloud, according to an exemplary embodiment of the present invention.

In an example illustrated in FIG. 6, user "Bob" has a home personal computer and a Blackberry, both associated with a virtual cloud 50 of the present invention. Bob selects his contacts, calendar, and four files for inclusion in his virtual cloud 50. The files are named Contract.pdf (Adobe Acrobat PDF Version 9.01), 2009Taxes.QBF (Quicken TurboTax), LetterToFriend (Microsoft Word Version 2007), and Welcome.pdf (Adobe Acrobat PDF). In the example, the first three files are initially stored only on the personal computer, and the Welcome.pdf file is stored only on the Blackberry.

FIG. 7 illustrates synchronization of the virtual cloud 50 initialized in FIG. 6, according to an exemplary embodiment of the present invention. As shown, the server 110 can command the software agents 140 to transfer files directly between the computing devices 130, to synchronize files or to facilitate remote control, as appropriate. If an entire folder is selected by the user as being part of a virtual cloud 50, then all of the files in the selected folder, including new files not previously included in the cloud, can be automatically synchronized as appropriate.

Returning to the example of FIGS. 6-7, the server 110 can identify that Adobe Acrobat is available on both computing devices 130, and the server 110 can then issue a command to the agents on the computing devices 130 to transmit copies of the Adobe files between the devices, so that the Adobe files are stored on both devices. The contacts and calendar information can also be synchronized automatically. Because, in this example, TurboTax and Word are not available on the Blackberry, the server 110 need not initiate transfer of the TurboTax and Word files to the Blackberry, as the Blackberry is not independently capable of displaying these files.

As discussed above, when a file type is not supported by a particular computing device 130, that computing device 130 can include a listing of virtual files in the virtual cloud 50 that belong to that file type. Thus, the user can select the virtual listing to initiate display of the file via seamless peer-to-peer networking. In the given example, after synchronization, the following files can be locally stored on the Bob's personal computer: Contract.pdf (Adobe Acrobat PDF), 2009Taxes.QBF (Quicken TurboTax), LetterToFriend (Microsoft Word), and Welcome.pdf (Adobe Acrobat PDF). And files locally stored on the Blackberry can be: Contract.pdf (Adobe Acrobat PDF), and Welcome.pdf (Adobe Acrobat PDF). While 2009Taxes.QBF and LetterToFriend may not be stored locally on the Blackberry, the networking system 100 can cause the Blackberry to display a virtual listing of these absent files.

A user can seamlessly access a file in the virtual cloud 50 that is not supported by a local computing device 130 by simply selecting the virtual listing for the file. When the user selects the virtual listing for the file, the server 110 can determine which other computing device 130 in the cloud is most appropriate for delivering the file in a peer-to-peer transfer. If multiple other computing devices 130 participating in the virtual cloud 50 have a copy of the file, the networking system 100 can evaluate various factors, including, for example, file transfer speed potential and preset user preferences, to select a remote computing device 130 to deliver the file. After a remote computing device 130 is selected, the remote software agent 140 on the remote computing device 130 can open the file in the appropriate program on the remote computing device 130 and can communicate with the local agent to display the program on the local computing device 130. The local software agent 140 can receive control commands from the user and transmit those commands to the remote software agent 140. Accordingly, through cooperation of the local and remote software agents 140, the user can seamlessly view and modify the file, regardless of whether file is in a file format supported by the local computing device 130.

In the example of FIGS. 6-7, Bob can view his 2009Taxes.QBF file on his Blackberry by selecting a virtual listing of that file on his Blackberry. The server 110 can then instruct the software agent 140 on the Blackberry to communicate with the agent on the personal computer, thereby remotely controlling TurboTax on the personal computer to access the file.

Because various types of computing devices 130 can access a single virtual cloud 50, an organization can establish a virtual cloud 50 for its members, wherein the members need not be limited to a set of predetermined, supported devices. Some organizations limit their members' device selection to ensure that the devices used by their members are able to access resources necessary for adequate performance of the members' duties within the organization. When using a virtual cloud 50, however, each member can access a resource related to the company through the virtual cloud 50, even if native support for the resource is not provided by a utilized computing device 130. For example, and not limitation, if an employee uses a device that does not natively support his or her employer's database application, the employee may still access a database of the employer from the computing device 130 through the peer-to-peer aspect of the virtual cloud 50.

In some embodiments of the networking system 100, virtual clouds 50 may be allowed to interact with one another based on rules and policies established by the applicable users. For example, a first user may share files with a second user by instructing the networking system 100 to allow the second user access to a specific folder or other predetermined set of files. At the server's prompting, as needed for synchronization, a computing device 130 of the first user may perform a peer-to-peer transfer of files to a computing device 130 of the second user. By this method, numerous virtual clouds 50 may be joined or overlapped as desired by the users.

The networking system 100 may enable social network integration by providing notifications of file transfers between virtual clouds 50. If a first user of a first virtual cloud 50 seeks to allow a second user of a second virtual cloud 50 access to certain files, at one or more of these users' request, the networking system 100 may grant a level of trust between the first and second virtual clouds 50 and their corresponding files, thus enabling synchronization between the two virtual clouds 50 in the manner requested. Upon creation or synchronization of a file from the first user to be shared between the clouds, the networking system 100, such as through the server 110, may provide a post to a social network of the second user, thus notifying the second user of the new file. For example, a first user may share pictures or other files in his virtual cloud 50 with a second user, where one or both of the first and second users are subscribed to a social network. When the first user synchronizes the shared pictures with his virtual cloud 50, the networking system 100 may provide a dialogue box linked to the social network to initiate notification to the social network. Through the dialogue box, the first user may post a notification and, if desired, in some embodiments, the shared pictures themselves. Messages regarding, for example, new pictures or other files posted to the first user's virtual cloud 50 may be published by the networking system 100 to the social network, but actual transfer of the files may occur by peer-to-peer transfer.

For example of the above, a first user takes pictures while on vacation, which pictures are stored in a "Vacation Pictures" folder on the first user's computing device 130, which is registered to a joint virtual cloud 50. The joint virtual cloud 50 may be shared between the first user and one or more other users. The first user indicates to the networking system 100 that the first user wishes to share the Vacation Pictures folder with the joint virtual cloud 50. A software agent 140 at the computing device 130 may then notify the server 110 of the new Vacation Pictures folder and its stored picture files. The server 110 may then store metadata associated with the folder and its files, and the server 110 may associate this information with the joint virtual cloud 50. Thus, when the other users sharing the virtual cloud 50 connect their registered computing devices 130 to the server 110, the networking system 100 may synchronize those computing devices 130 with the first user's computing device 130 to provide copies of the Vacation Pictures folder and its files on the other users' computing devices 130. The server 110 may also publish to a social network, such as Facebook®, a notification that the Vacation Pictures folder was newly added to the joint virtual cloud 50.

Accordingly, as described above, a virtual cloud according to an exemplary embodiment of the present invention may enable a user at a selected computing device to access the most recent versions of remote files and other resources, and may further enable the user to access files and other resources not natively supported by the selected computing device.

While various embodiments of the networking system have been disclosed in exemplary forms, many modifications, additions, and deletions can be made without departing from the spirit and scope of the invention and its equivalents, as set forth in the following claims.

What is claimed is:

1. A method comprising:
    receiving indications of a plurality of files;
    receiving indications of two or more computing devices;
    transmitting, to each respective computing device from the two or more computing devices, a respective software agent;
    receiving, from the software agents transmitted to the two or more computing devices, updates relating to a status, at the two or more computing devices, of files from the plurality of files, the updates including an indication, from a first software agent, of a first edit to a first file from the plurality of files, an indication, from a second software agent, of a second edit to the first file, and information related to a new file to be added to the plurality of files;
    receiving a request, from the respective software agent at a first computing device from the two or more computing devices, to access the first file;
    responsive to the request from the respective software agent at the first computing device to access the first file, determining, by a processor, whether the first file at the first computing device is improvable;
    responsive to determining the first file at the first computing device is not improvable, instructing the respective software agent at the first computing device to provide access to the first file at the first computing device;
    responsive to determining the first file at the first computing device is improvable based at least in part on comparing a first timestamp associated with the first edit and a second timestamp associated with the second edit and determining the second timestamp is more recent, transmitting an instruction, to a second computing device associated with the second software agent, to transmit a version of the first file at the second computing device to the first computing device; and
    posting an indication of the new file to a social network.

2. The method of claim 1, further comprising providing each of the two or more computing devices with access to each of the plurality of files.

3. The method of claim 1, wherein there is a second version of the first file at the first computing device, and the version of the first file received from the second computing device replaces the second version of the first file at the first computing device.

4. The method of claim 1, wherein there is a second version of the first file at the first computing device, and the respective software agent at the first computing device is configured to send the request to access the first file based on a local request for access to the first file at the first computing device.

5. A computer program product embodied in a non-transitory computer-readable medium, the computer program product comprising an algorithm adapted to effectuate a method, the method comprising:
    receiving indications of a plurality of files;
    receiving indications of two or more computing devices;
    transmitting, to each respective computing device from the two or more computing devices, a respective software agent;
    receiving, from the software agents transmitted to the two or more computing devices, updates relating to a status, at the two or more computing devices, of files from the plurality of files, the updates including an indication, from a first software agent, of a first edit to a first file from the plurality of files, an indication, from a second software agent, of a second edit to the first file, and information related to a new file to be added to the plurality of files;
    receiving a request, from the respective software agent at a first computing device from the two or more computing devices, to access the first file;
    responsive to the request from the respective software agent at the first computing device to access the first file, determining, by a processor, whether the first file at the first computing device is improvable;
    responsive to determining the first file at the first computing device is not improvable, instructing the respective software agent at the first computing device to provide access to the first file at the first computing device;
    responsive to determining the first file at the first computing device is improvable based at least in part on comparing a first timestamp associated with the first edit and a second timestamp associated with the second edit and determining the second timestamp is more recent, transmitting an instruction, to a second computing device associated with the second software agent, to transmit a version of the first file at the second computing device to the first computing device; and posting an indication of the new file to a social network.

6. The computer program product of claim 5, the method further comprising providing each of the two or more computing devices with access to each of the plurality of files.

7. The computer program product of claim 5, wherein there is a second version of the first file at the first computing device, and the version of the first file received from the second computing device replaces the second version of the first file at the first computing device.

8. The computer program product of claim 5, wherein there is a second version of the first file at the first computing device, and the respective software agent at the first computing device is configured to send the request to access the first file based on a local request for access to the first file at the first computing device.

9. A system comprising:
at least one processor;
at least one memory operatively coupled to the at least one processor and configured for storing data and instructions that, when executed by the at least one processor, cause the system to perform a method comprising:
receiving indications of a plurality of files;
receiving indications of two or more computing devices;
transmitting, to each respective computing device from the two or more computing devices, a respective software agent;
receiving, from the software agents transmitted to the two or more computing devices, updates relating to a status, at the two or more computing devices, of files from the plurality of files, the updates including an indication, from a first software agent, of a first edit to a first file from the plurality of files, an indication, from a second software agent, of a second edit to the first file, and information related to a new file to be added to the plurality of files;
receiving a request, from the respective software agent at a first computing device from the two or more computing devices, to access the first file;
responsive to the request from the respective software agent at the first computing device to access the first file, determining, by the at least one processor, whether the first file at the first computing device is improvable;
responsive to determining the first file at the first computing device is not improvable, instructing the respective software agent at the first computing device to provide access to the first file at the first computing device;
responsive to determining the first file at the first computing device is improvable based at least in part on comparing a first timestamp associated with the first edit and a second timestamp associated with the second edit and determining the second timestamp is more recent, transmitting an instruction, to a second computing device associated with the second software agent, to transmit a version of the first file at the second computing device to the first computing device; and
posting an indication of the new file to a social network.

10. The system of claim 9, the method further comprising providing each of the two or more computing devices with access to each of the plurality of files.

11. The system of claim 9, wherein there is a second version of the first file at the first computing device, and the version of the first file received from the second computing device replaces the second version of the first file at the first computing device.

12. The system of claim 9, wherein there is a second version of the first file at the first computing device, and the respective software agent at the first computing device is configured to send the request to access the first file based on a local request for access to the first file at the first computing device.

\* \* \* \* \*